United States Patent
Truta et al.

(10) Patent No.: US 8,542,207 B1
(45) Date of Patent: Sep. 24, 2013

(54) PENCIL ERASER GESTURE AND GESTURE RECOGNITION METHOD FOR TOUCH-ENABLED USER INTERFACES

(76) Inventors: Cosmin Truta, Waterloo (CA); Alex Nicolaou, Waterloo (CA)

(*) Notice: Subject to any disclaimer, the term of this patent is extended or adjusted under 35 U.S.C. 154(b) by 111 days.

(21) Appl. No.: 13/246,702

(22) Filed: Sep. 27, 2011

(51) Int. Cl.
 *G06F 3/041* (2006.01)
(52) U.S. Cl.
 USPC .......... 345/173; 345/174; 345/179; 345/104; 463/37
(58) Field of Classification Search
 USPC .................. 345/156, 169, 171, 183, 60, 642, 345/173–179, 104; 715/863, 753; 463/37
 See application file for complete search history.

(56) References Cited

U.S. PATENT DOCUMENTS

| | | | | |
|---|---|---|---|---|
| 4,558,313 | A * | 12/1985 | Garwin et al. | 345/179 |
| 5,602,570 | A * | 2/1997 | Capps et al. | 345/173 |
| 2010/0295773 | A1 | 11/2010 | Alameh et al. | |
| 2010/0299642 | A1 | 11/2010 | Merrell et al. | |
| 2011/0126129 | A1 * | 5/2011 | Nagahara et al. | 715/753 |

* cited by examiner

*Primary Examiner* — Lun-Yi Lao
*Assistant Examiner* — Olga Merkoulova
(74) *Attorney, Agent, or Firm* — Troutman Sanders LLP; James E. Schutz; Chris W. Glass

(57) ABSTRACT

Methods and systems for receiving an erasure gesture input and accordingly deleting content in a viewable area of a multi-touch input display device are disclosed. A touch gesture can be detected on a touch screen. One or more direction changes associated with the touch gesture can be detected and the angle of each of the direction changes can be determined to meet a predetermined threshold. The touch gesture can be detected as no longer touching the touch screen and a polygon can be generated based on each of the direction changes associated with the touch gesture.

24 Claims, 5 Drawing Sheets

PENCIL ERASER GESTURE AND GESTURE RECOGNITION METHOD FOR TOUCH-ENABLED USER INTERFACES

BACKGROUND

1. Field

The field relates to a touch display device.

2. Background

Touch-enabled user interfaces are frequently used in association with computer displays, smart phones, tablet computing devices, personal digital assistants (PDAs) and other computational devices. Touch-enabled user interfaces revolve around computer-pointing technology based upon the sense of touch. Touch-enabled user interfaces not only allow the sense of touch to activate computer-based functions, but it also allows the user, an additional level of interaction based upon the kind of input. The touch-enabled user interface allows a user to interact directly with the content that is displayed without any intermediate device. In general, a device with a touch-enabled user interface also has a touch-sensitive surface overlay.

In one example of using a touch enabled user interface device, a user may access a web page from the Internet and select text and/or images by using his or her fingers to perform the appropriate gesture to enter a selection mode. When selecting the text and/or images from the web page, the user may select a single word or image or a plurality of words or images simply by moving his or her finger against the surface of the touch screen display device over a targeted area.

More advanced touch features may include allowing users to perform any variety of functions including but not limited to, drawing images and typing on an onscreen keyboard. For example, an application may allow a user to draw pictures or type a document using their fingers and editing of these pictures or documents can be accomplished using similar gestures.

However, the above-noted touching operations and advanced touching operations are unrefined and lack simplicity. These smaller touch-enabled user interface devices often produce smaller images and text, which make it difficult for a user who wishes to edit these smaller images and text such as erasing portions of the images or text. Touch-enabled user interfaces must provide optimum user satisfaction, and the editing capabilities on the newer pocket and travel-sized display devices requires increasingly simple and prompt editing options for the users' satisfaction.

BRIEF SUMMARY

One innovative aspect of the subject matter described in this specification is embodied in methods that include detecting a touch gesture on a touch screen, identifying one or more direction changes associated with the touch gesture, determining that an angle of each of the one or more direction changes meets a predetermined threshold, detecting that the touch gesture is no longer touching the touch screen, and generating a polygon based on one or more direction changes and the angle of each of the one or more direction changes.

Another innovative aspect of the subject matter described in this specification is embodied in systems comprising: one or more computers and one or more storage devices storing instructions that are operable, when executed by the one or more computers, to cause the one or more computers to perform operations comprising: detecting a touch gesture on a touch screen, identifying one or more direction changes associated with the touch gesture, determining that an angle of each of the one or more direction changes meets a predetermined threshold, detecting that the touch gesture is no longer touching the touch screen, and generating a polygon based on one or more direction changes and the angle of each of the one or more direction changes.

Another innovative aspect of the subject matter described in this specification is embodied in a non-transitory computer-readable medium storing software comprising instructions executable by one or more computers which, upon execution, cause the one or more computers to perform operations comprising: detecting a touch gesture on a touch screen, identifying one or more direction changes associated with the touch gesture, determining that an angle of each of the one or more direction changes meets a predetermined threshold, detecting that the touch gesture is no longer touching the touch screen, and generating a polygon based on one or more direction changes and the angle of each of the one or more direction changes.

Further embodiments, features, and advantages, as well as the structure and operation of the various embodiments are described in detail below with reference to accompanying drawings.

BRIEF DESCRIPTION OF THE DRAWINGS/FIGURES

Embodiments are described with reference to the accompanying drawings. In the drawings, like reference numbers may indicate identical or functionally similar elements. The drawing in which an element first appears is generally indicated by the left-most digit in the corresponding reference number.

DETAILED DESCRIPTION

Figure 1:
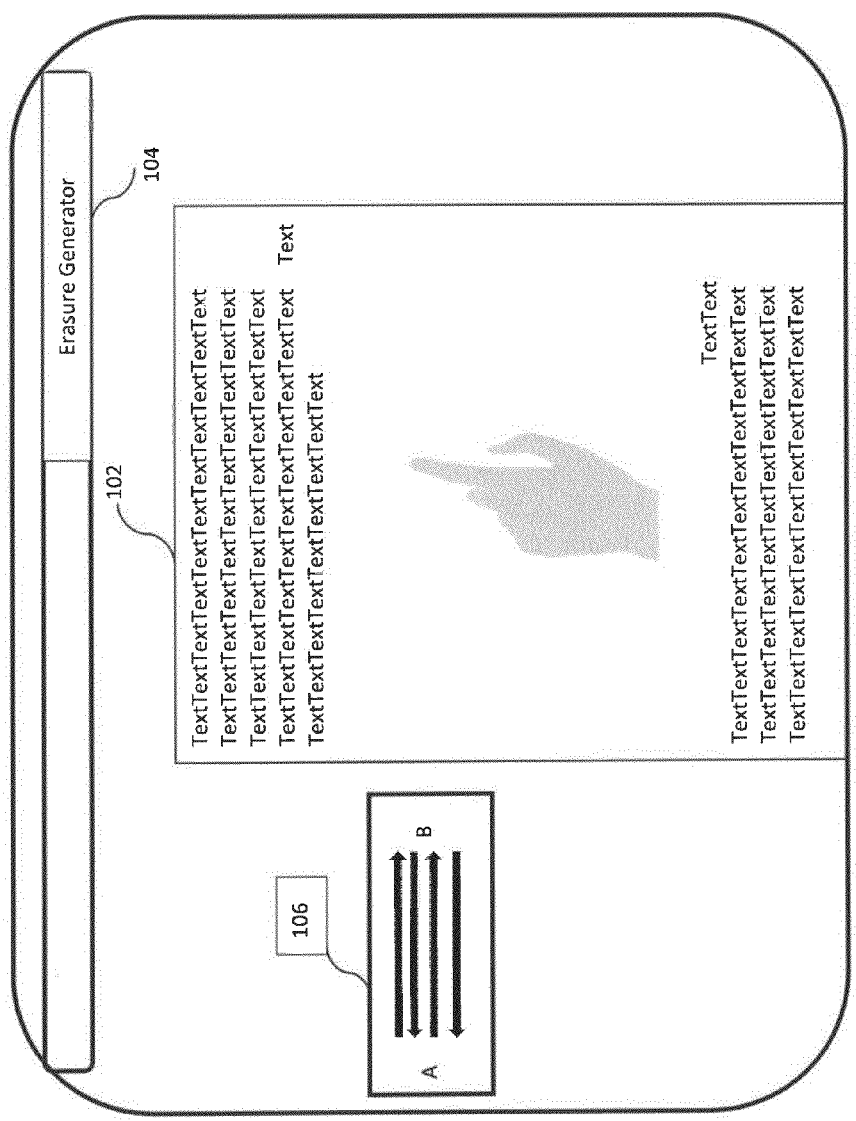
FIG. 1 is an illustration of an example display view of performing an erasure operation.

Touch screen devices generally provide a touch-sensitive screen that overlays a display monitor or screen. Devices can use different methods to detect an input on a touch screen. One method uses sensors and circuitry to monitor the changes in a particular state. Additional methods monitor the changes in electrical currents or reflection of waves. Regardless of the method, the premise of the touch screen remains the same: when a user places a finger or a stylus on the screen, it changes the state that the device is monitoring. The kind of gesture that the user inputs determines the state that is entered.

Typical touch screen devices use a layer of capacitive material to hold an electrical charge; touching the screen changes the amount of charge at a specific point of contact. The capacitive material may be based on a two-dimensional coordinate grid (X-axis, Y-axis). The areas that are touched create a voltage, which is detected as being at a particular location on the coordinate grid. Specific examples of touch screen materials may include mutual capacitance, which utilizes two distinct layers of material for sensing touch and driving a voltage or current. Another example is self-capacitance, which uses one layer of individual electrodes connected to capacitance-sensing circuitry. The examples of underlying touch screen technology are for example purposes only and will be omitted from further discussion.

In general, the processor and associated operating system can detect and analyze the received touch input and provide a result based on the kind of input. For example, when a user touches a touch screen surface, the capacitive material sends touch-location data to the processor. The processor uses software stored in the memory to interpret the data as commands and gestures. Input received from the touch screen is sent to the processor as electrical impulses. The processor uses software to analyze the data and determine the characteristics of each touch, such as the size, shape and location of the touched area on the display touch screen.

Analysis software may be used to determine the type of gesture received by the touch screen. For example, a single tap gesture using one or more fingers followed by the user moving their finger(s) across the touch screen device and performing one or more directional changes with each of the one or more directional changes having an angle that meets a predetermined threshold, can be interpreted as an erasure gesture.

Embodiments described herein refer to illustrations for particular application. It should be understood that the invention is not limited to the embodiments. Those skilled in the art with access to the teachings provided herein will recognize additional modifications, applications, and embodiments within the scope thereof and additional fields in which the embodiments would be of significant utility.

It would also be apparent to one of skill in the relevant art that the embodiments, as described herein, can be implemented in many different embodiments of software, hardware, firmware, and/or the entities illustrated in the figures. Any actual software code with the specialized control of hardware to implement embodiments is not limiting of the detailed description. Thus, the operational behavior of embodiments will be described with the understanding that modifications and variations of the embodiments are possible, given the level of detail presented herein.

In the detailed description of embodiments that follows, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

FIG. 1 is an illustration of an example display view of performing an erasure operation. The content area 102 of the touch screen display device may be organized by a computer program such as a web browser, which displays web pages and websites for the user.

In one embodiment, the user is interacting with a web browser that has an erasure generator plug-in 104. The erasing operation may be performed by using one or more fingers to remove the targeted viewable section of the display. For example, a user may begin by placing an index finger, or any other finger, on the touch screen display area 102. The initial placement of the finger can be detected by the display device as a touch gesture on the touch screen. Touch screen display area 102 provides a view of content as generated by the web browser. In this example, the content area consists of text, which may be, for example, snippets or portions of a user's emails that is currently being composed. The user may execute a mail application on their computing device (smart phone, PDA, tablet, personal computer, laptop, etc.), and then begin composition of an email, which may result in the content of that email message being displayed to occupy the display area of the computing device. The content illustrated in FIG. 1 is represented as text, but, the content may also be pictures or any other related content types.

Upon the user placing a finger into the initial position and moving the finger across the surface of the display in a horizontal direction, the touch screen detects the initial touch gesture. The touch screen device can record the initial position coordinates of the finger on the touch screen, as well as the position coordinates of all subsequent movements of the finger, as illustrated by gesture 106. When the user continues moving the finger across the surface of the display while performing one or more direction changes, it is then determined whether the angle of each of the one or more direction changes meets a predetermined threshold. If the threshold is met for each of the directional angle changes, the touch device can recognize the gesture as an erasure gesture. For example, the user may scrub the touch screen like a pencil eraser, performing a plurality of direction changes with each direction change having an angle less than or equal to a predetermined constant. This movement and angle change represents an erasure gesture. The predetermined constant may vary according to the kind of user interaction or the characteristics of the content to be erased. For example, the predetermined threshold may depend on the pressure the user is using to perform the gesture on the touch screen, whether the gesture is performed with a stylus or a finger, or the zoom level of the content to be erased.

The touch screen device records the coordinates of the finger movement along with the angles of each of the one or more direction changes. Once the erase gesture is completed and the user's finger is no longer touching the screen, erasure generator plug-in 104 can generate a polygon based on one more direction changes and the angle of each of the one or more direction changes.

In one embodiment, a gesture event can be generated including the polygon and coordinates of the polygon and be provided to an application displayed relative to the polygon on the mobile device, wherein the program removes the content displayed within the polygon. For example, the coordinates of the generated polygon can be sent by the erasure generator plug-in to the web browser via events. The program and operating system running the web browser can handle the events and erase the content making it no longer visible by the user.

In one embodiment, the erasing of the content may be continuous. The user can visually experience the removal of portions of the content as the erase gesture is performed. In another embodiment, the erasing of the content can take place after the erase gesture is fully completed. The user can visually experience the removal of the complete content after the erase gesture is performed.

It may be possible that multiple web browser windows are displayed when a gesture is performed. In one scenario, a gesture crossing multiple windows may indicate that an erasure gesture is not intended. For example, it may indicate a move gesture, in which the user intends to move one or more windows to another location. In the alternative, a gesture crossing multiple windows may be recognized as an erasure gesture. In such a scenario, the generated polygon of the erasure gesture can intersect with the multiple browser windows. The operating system running the web browser windows can manage and determine which of the windows receives the event and thus perform the erasure gesture removing that window's content. Examples of managing which window will receive an erasure gesture event may include, but are not limited to, selecting a window based on z-order, or selecting the window that contains the center of the generated polygon. Z-order is an ordering of overlapping two-dimensional objects, such as windows in a graphical user interface, shapes in a vector graphics editor, or objects in a 3D application. In general, the z-order of a GUI can be modified by selecting a window to be brought in front of all the other windows. Depending on the kind of window manager, interaction with windows may occur while they are not in the front or whenever it receives an input from the user. When dealing with visual objects on a computer screen, an object with a z-order of 1 would be visually behind an object with a z-order of 2 or greater. Z-ordering is also used in 3D applications to determine object visibility based on overlapping.

Figure 2:
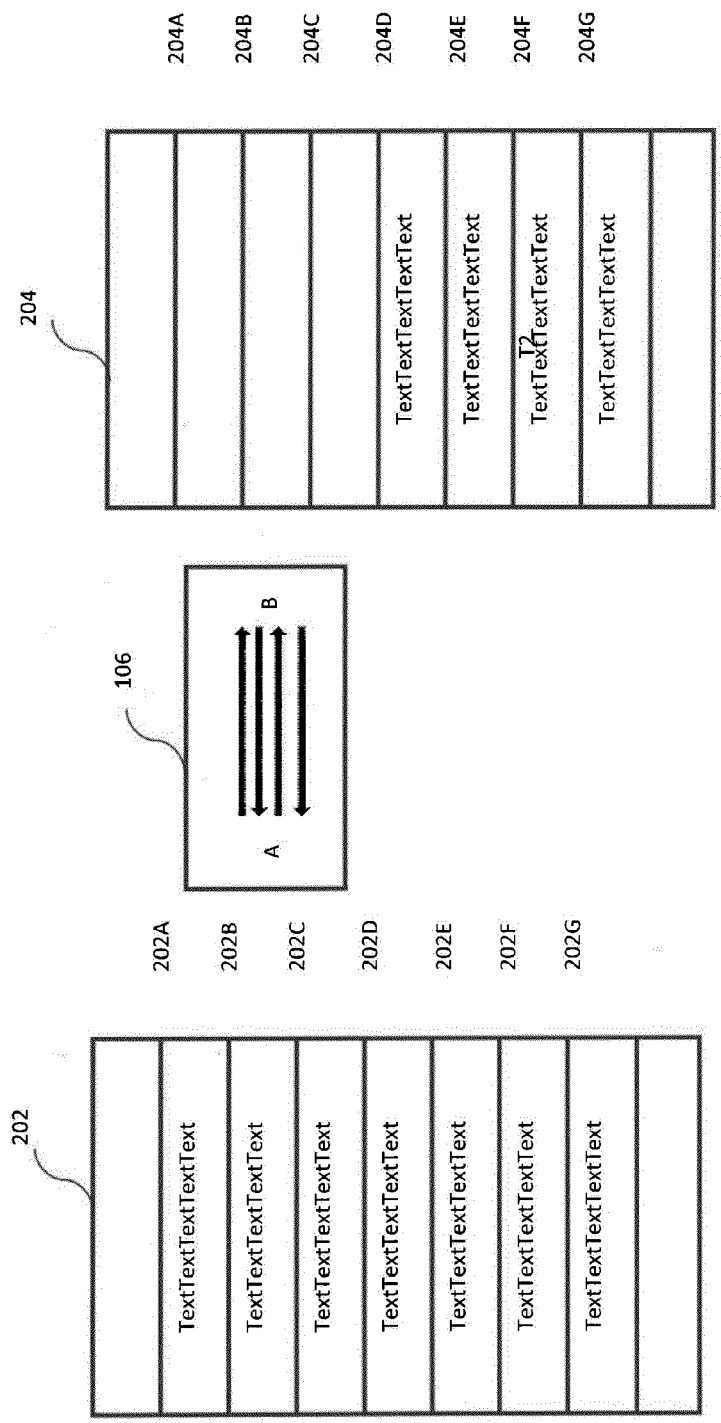
FIG. 2 is an illustration of an example display view transformation before and after performing an erasure operation.

FIG. 2 is an illustration of an example display view transformation before and after performing an erasure operation. The display area 202 of the touch screen display device may be organized into a plurality of rows representing separate sections of a display area.

In one embodiment the operating system may have a virtual processing mechanism which detects and performs gesture analysis, while the content may be generated by a program generated by a developer for the operating system. The initial placement of the finger can be detected by the display device as a touch gesture 106 on the touch screen. In this example, the user may place one finger at point "A" on the touch screen. Although the position of point A is illustrated as being off the touch screen area 202, generally the user would place their finger on the display area directly.

Display area 202 provides a view of several rows of content 202A-202G. In this example, each row is filled with text, which may be, for example, snippets or portions of a document that is currently being constructed using a text-editor. The user may execute a text-editing program on their computing device (smart phone, PDA, tablet, personal computer, laptop, etc.), and then begin composition of document, which may result in the content of that document being displayed to occupy the display area of the computing device. When the user continues moving the finger across the surface of the display in a scrubbing motion, while performing one or more direction changes between position "A" and position "B", it is then determined whether an angle of each of the one or more direction changes meets a predetermined threshold. For example, the user may perform a plurality of direction changes between position "A" and position "B", with each direction change having an angle of less than or equal to the predetermined threshold. The scrubbing motion and angle change represents an erasure gesture. The user has indicated to the display device that the area between positions "A" and "B" is of interest to the user and should be removed. In other words, the erasing operation performed near the targeted rows has resulted in the removal of that content from the display view 202, as shown in 204, rows of content 204A-204C. The predetermined threshold may vary according to the kind of user interaction or the characteristics of the content to be erased. For example, rows of content 204A-204C may contain text, which is small in size. In such a scenario, the predetermined threshold angle may be smaller than the scenario where the rows of content 204A-204C contain larger sized text.

The erasure operation effectively removes the content from the rows. For instance, before the erasure operation, each row had equal amounts of content. After the erasure gesture near or adjacent to the rows of interest, the erasing operation ensured that the content within the targeted rows were removed and no longer displayed. Similar modifications may be made in the horizontal direction to erase a column area (not shown). The area of interest or the section of text, image or group of text or images may be removed to provide the ability to add additional text or images.

Figure 3:
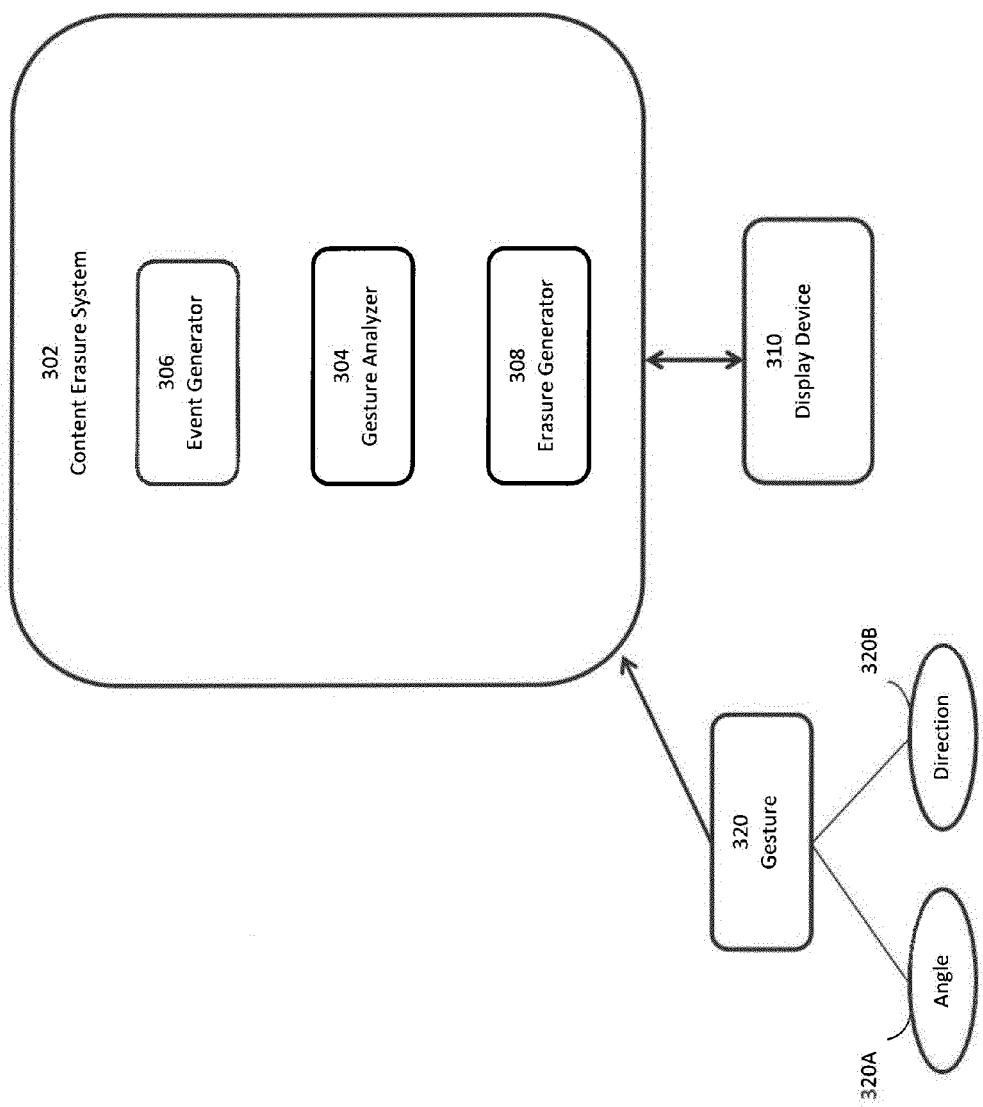
FIG. 3 is an illustration of an example erasure system.

FIG. 3 is an illustration of an example erasure system. Content erasure system 302, or any combination of its components, may be part of or may be implemented with a computing device. Examples of computing devices include, but are not limited to, a computer, workstation, distributed computing system, computer cluster, embedded system, standalone electronic device, networked device, mobile device (e.g. mobile phone, smart phone, navigation device, tablet or mobile computing device), rack server, set-top box, or other type of computer system having at least one processor and memory. Such a computing device may include software, firmware, hardware, or a combination thereof. Software may include one or more applications and an operating system. Hardware can include, but is not limited to, a processor, memory and user interface display.

Content erasure system 302 may include a gesture analyzer 304, an event generator 306, and an erasure generator 308. Content erasure system 302 is in communication with a display device 310, which may be used to display configurations of the erasure gesture operation. Content erasure system 302 may allow for the removal of content specified by a user. By performing a touch gesture operation 320, gesture analyzer 304, event generator 306, and erasure generator 308 are configured to remove content targeted by the touch gesture operation 320. For example, if the user would like to remove a block of text or a portion of a figure, performing touch gesture operation 320 can allow for the erasure of the specified content.

In operation, display device 310 can detect a touch gesture operation 320, with event generator 306 generating a list of corresponding events according to the touch gesture operation 320. In general, when a touch gesture operation 320 is performed on display device 310, the gesture is processed by triggering events according to the touch gesture operation 320. A start event is generated when the touch gesture operation 320 begins by the user placing a finger or stylus on the display device 310. Any subsequent movement of the finger across the display device 310 can generate one or more move events corresponding to each movement of the finger. Upon completion of the touch gesture operation 320, the finger or stylus will be removed from the display device 310, triggering an end event. The generated start event, one or more move events, and end event may be stored as a list of events that can be processed to determine the kind of touch gesture operation that was performed.

Touch gesture operation 320 mimics the motion of a pencil eraser. The user places a finger or stylus on the display device 310 and scrubs over the area of content, which should be erased. Touch gesture operation 320 is comprised of a constant movement by the user on the display device 310 with one or more direction changes 320B at a predetermined angle threshold 320A. The content targeted for removal by the user is the location on the display device 310 in which the touch gesture operation 320 may be performed. Gesture analyzer 304 can identify one or more direction changes associated with the touch gesture operation 320 with event generator 306 generating the corresponding one or more move events for each directional change. When the touch gesture operation 320 stops and the finger or stylus is lifted off of the display device 310, gesture analyzer 304 can then detect that the touch gesture operation 320 is no longer touching the display device 310 with event generator 306 generating a corresponding end event indicating the end of the touch gesture operation 320. Event generator 306 can send the list of events to erasure generator 308, which can generate a polygon based on one or more direction changes and the angle of each of the one or more direction changes. The polygon coordinates can then be used by an operating system to remove the content specified by the user.

Figure 4:
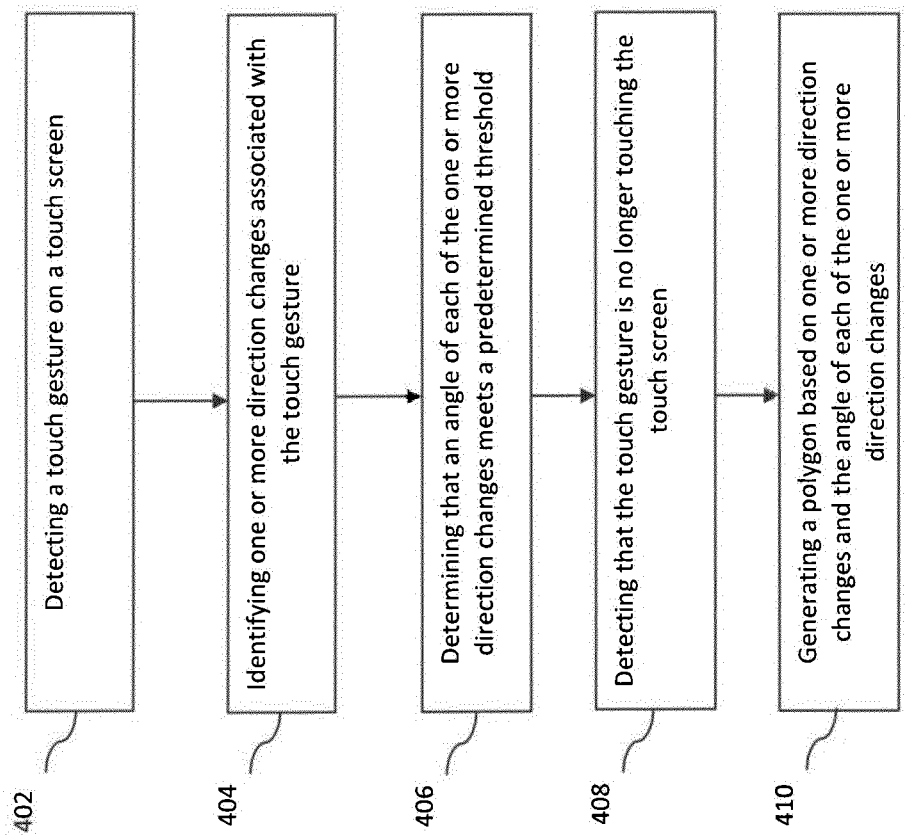
FIG. 4 is a flow diagram of an example method for performing an erasure operation.

FIG. 4 is a flow diagram of an example method 400 for performing an erasure operation.

A touch gesture operation 320 is detected on a touch screen, at step 402. In an exemplary embodiment, the touch gesture is detected by gesture analyzer 304 of system 300. For example, upon a user placing a finger or stylus on display device 310, the initial placement is detected on the touch screen by gesture analyzer 304. This indicates the beginning of the touch gesture operation 320.

One or more direction changes associated with the touch gesture operation 320 are identified at step 404. In an exemplary embodiment, the one or more direction changes associated with the touch gesture operation 320 are identified by gesture analyzer 304 of system 300. A user performs touch gesture operation 320 with the purpose of erasing specific content. The touch gesture operation 320 mimics the movement of a traditional pencil eraser. When erasing the content, the user must perform one or more directional changes with their finger or stylus, as one would do when erasing content with a pencil eraser. The one of more directional changes is done until the targeted content is completely erased.

The angle of each of the one of more direction changes associated with the touch gesture operation 320 is determined to meet a predetermined threshold at step 406. In an exemplary embodiment, the determination of whether the angle of each of the one of more direction changes associated with the touch gesture operation 320 may be performed by gesture analyzer 304 of system 300. The angle of the direction changes of touch gesture operation 320 must meet a predetermined threshold, in order to indicate that the targeted content should be erased. For example, in order to properly erase and remove content, the user can make one or more directional changes across the targeted content, with each directional change being less than an angle dependant upon the kind of user interaction or the characteristics of the content to be erased. The predetermined threshold may depend on the pressure the user is using to perform the gesture on the touch screen, whether the gesture is performed with a stylus or a finger, or the zoom level of the content to be erased. A directional change greater than the angle threshold would not erase the content. The predetermined angle threshold is used by gesture analyzer 304 to determine that an erase gesture is intended by the user. An angle change greater than the predetermined threshold may indicate another kind of gesture or no gesture at all.

The touch gesture is detected as no longer touching the touch screen, at step 408. In an exemplary embodiment, the touch gesture is detected by gesture analyzer 304 of system 300. When the user has completed the removal of the specified content, they will end the touch gesture operation 320 by lifting their finger or stylus off of the display device 310. Once the finger or stylus is no longer in contact with the display device, gesture analyzer 304 detects that the touch gesture operation 320 has been completed.

A polygon is generated based on the one more direction changes and the angle of each of the one or more direction changes, at step 410. In an exemplary embodiment, step 410 may be performed by erasure generator 308 of system 300. The movement of the touch gesture operation 320 may create a polygon with each side represented by the path of the movement of the user's finger or stylus and each vertex represented by each directional and angle change. For example, when the user chooses to erase the targeted content, they may place their finger or stylus on the display device 310 and move it back and forth in a scrubbing manner across the targeted area. Each back and forth movement represents a direction change with an angle associated with it. The back and forth movement combined with the angles generates a polygon, such as, but not limited to, a star tetrahedron. The generated polygon can encompass the targeted content area for removal which will be erased.

Identifying the one or more direction changes can also include determining that the touch gesture is moving on the touch screen and recording the movement of the touch gesture. This may take place at event generator 306 of system 300. When the user performs touch gesture operation 320, the movement of the finger or stylus must be tracked and processed. Event generator 306 may record the series of movements on the touch screen and generate a corresponding move event for each directional change, as discussed previously.

The polygon generated at step 410 may be provided to a program currently displayed relative to the polygon on a mobile device, wherein the program removes data displayed within the polygon. For example, a user may be using a software editor program on a touch screen device and would like to erase a portion of content. Once the polygon is generated based on the user's back and forth scrubbing motion on the display device 310, the polygon is passed to the software editor program, which would then erase the content encompassed by the polygon. The program may erase the content at real-time, which would allow the user to see the content removed as the touch gesture operation 320 is performed. The program may also erase the content after the touch gesture operation 320 is performed. In this scenario, the user will not see any of the content removed until the touch gesture operation 320 is completed, at which time the software editor program will process the generated polygon and remove the targeted content.

A gesture event including the polygon and coordinate of the polygon may be provided to an application displayed relative to the polygon on the mobile device. The program running the application can then remove the data displayed within the polygon. Touch gesture operation 320 may send its list of events associated with performing the gesture to an application running on the mobile device. The list of events is a representation of the polygon and its coordinates, which can be generated upon performing touch gesture operation 320. The coordinates of the generated polygon can be sent by the erasure generator 308 to a web browser via the gesture event. The program and operating system running the web browser can handle the gesture event and erase the content making it no longer visible by the user.

Figure 5:
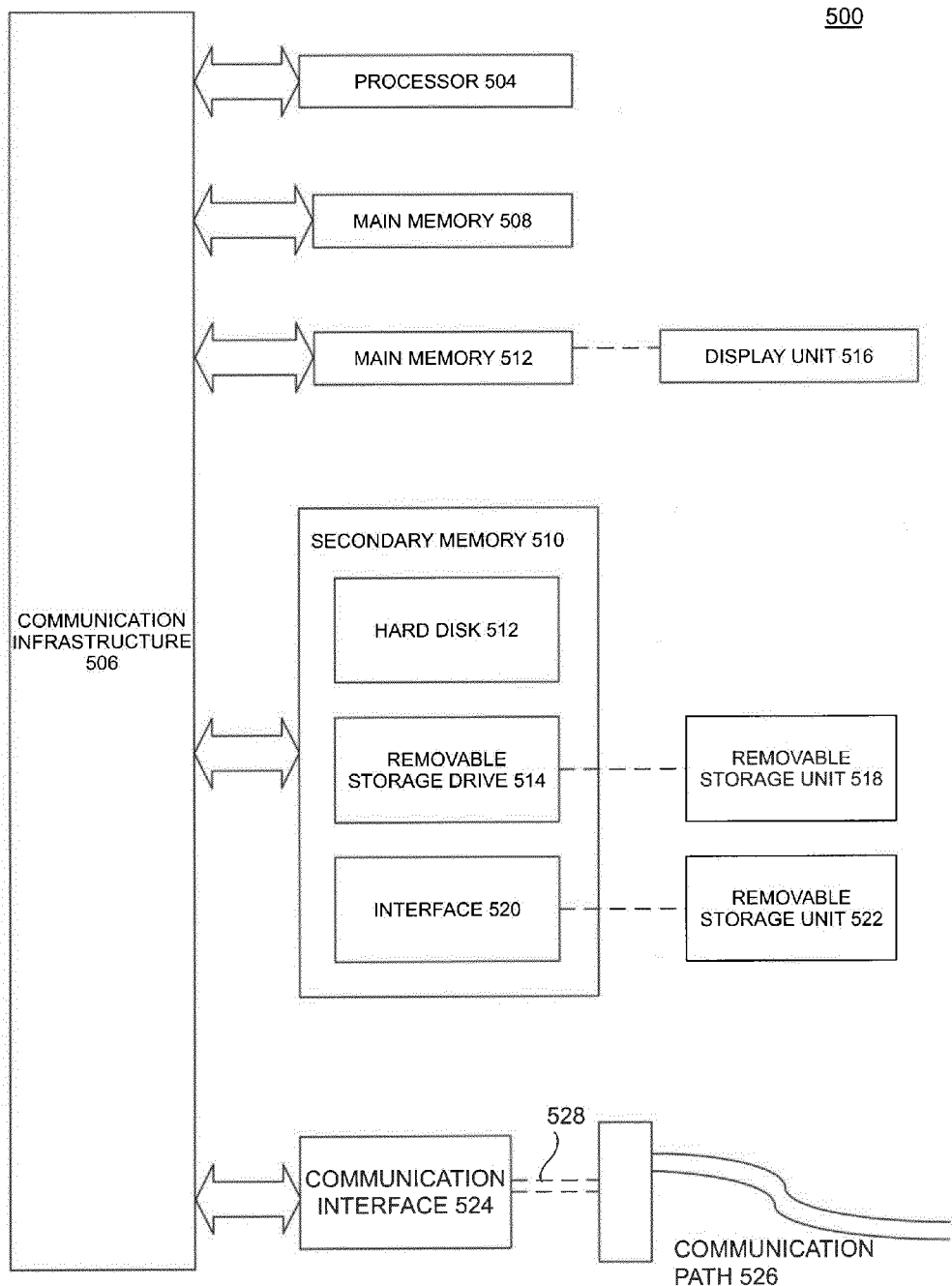
FIG. 5 is a diagram of a system that may be used to implement embodiments disclosed herein.

Various aspects of the present invention can be implemented by software, firmware, hardware, or a combination thereof. FIG. 5 illustrates an example computer system 500 in which the embodiments, or portions thereof, can be implemented as computer-readable code. For example, content erasure system 302 carrying out method 400 of FIG. 4 can be implemented in system 500. Various embodiments of the invention are described in terms of this example computer system 500.

Computer system 500 includes one or more processors, such as processor 504. Processor can be a special purpose or a general purpose processor. Processor 504 is connected to a communication infrastructure 506 (for example, a bus or network).

Computer system 500 also includes a main memory 508, preferably random access memory (RAM), and may also include a secondary memory 510. Secondary memory 510 may include, for example, a hard disk drive and/or a removable storage drive. Removable storage drive 514 may include a floppy disk drive, a magnetic tape drive, an optical disk drive, a flash memory, or the like. The removable storage drive 514 reads from and/or writes to removable storage unit 518 in a well-known manner. Removable storage unit 518 may include a floppy disk, magnetic tape, optical disk, etc. which is read by and written to by removable storage drive 514. As will be appreciated by persons skilled in the relevant art(s), removable storage unit 518 includes a computer usable storage medium having stored therein computer software and/or data.

In alternative implementations, secondary memory 510 may include other similar means for allowing computer programs or other instructions to be loaded into computer system 500. Such means may include, for example, a removable storage unit 522 and an interface 520. Examples of such means may include a program cartridge and cartridge interface (such as that found in video game devices), a removable memory chip (such as an EPROM, or PROM) and associated socket, and other removable storage units 522 and interfaces 520 which allow software and data to be transferred from the removable storage unit 522 to computer system 500.

Computer system 500 may also include a communications interface 524. Communications interface 524 allows software and data to be transferred between computer system 500 and external devices. Communications interface 524 may include a modem, a network interface (such as an Ethernet card), a communications port, a PCMCIA slot and card, or the like. Software and data transferred via communications interface 524 are in the form of signals which may be electronic, electromagnetic, optical, or other signals capable of being received by communications interface 524. These signals are provided to communications interface 524 via a communications path 526. Communications path 526 carries signals and may be implemented using wire or cable, fiber optics, a phone line, a cellular phone link, an RF link or other communications channels.

In this document, the term "computer readable storage medium" is used to generally refer to media such as removable storage unit 518, removable storage unit 522, and a hard disk installed in hard disk drive 512. Computer readable storage medium can also refer to one or more memories, such as main memory 508 and secondary memory 510, which can be memory semiconductors (e.g. DRAMs, etc.). These computer program products are means for providing software to computer system 500.

Computer programs (also called computer control logic) are stored in main memory 508 and/or secondary memory 510. Computer programs may also be received via communications interface 524. Such computer programs, when executed, enable computer system 500 to implement the embodiments as discussed herein. In particular, the computer programs, when executed, enable processor 504 to implement the processes of embodiments of the present invention, such as the steps in the methods discussed above. Accordingly, such computer programs represent controllers of the computer system 500. Where embodiments are implemented using software, the software may be stored in a computer program product and loaded into computer system 500 using removable storage drive 514, interface 520, or hard drive 512.

Embodiments may be directed to computer products comprising software stored on any computer usable medium. Such software, when executed in one or more data processing device, causes a data processing device(s) to operate as described herein.

Embodiments may be implemented in hardware, software, firmware, or a combination thereof. Embodiments may be implemented via a set of programs running in parallel on multiple machines.

The summary and abstract sections may set forth one or more but not all exemplary embodiments of the present invention as contemplated by the inventor(s), and thus, are not intended to limit the present invention and the appended claims in any way.

Embodiments of the present invention have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed. The breadth and scope of the present invention should not be limited by any of the above-described exemplary embodiments.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

What is claimed is:

1. A computer implemented method, comprising:
    detecting, by a processor, a touch gesture on a touch screen;
    detecting that a pressure of the touch gesture exceeds a predetermined threshold pressure value;
    identifying one or more direction changes of the touch gesture;
    determining that an angle of each of the one or more direction changes of the touch gesture exceeds a predetermined angle threshold value wherein the predetermined angle threshold value depends on the pressure of the touch gesture;
    detecting that the touch gesture has terminated;
    identifying content on the touch screen associated with the touch gesture in response to determining that the angle of each one of the one or more direction changes exceeds the predetermined angle threshold value; and
    removing the content associated with the touch gesture.

2. The method of claim 1, wherein identifying one or more direction changes associated with the touch gesture comprises:
    recording an initial location of the touch gesture;
    determining that the touch gesture is moving on the touch screen; and
    recording movement of the touch gesture.

3. The method of claim 1, further comprising:
    generating a polygon based on one or more direction changes and the angle of each of the one or more direction changes; and
    providing the polygon to a program currently displayed relative to the polygon.

4. The method of claim 1, further comprising:
generating a polygon based on one or more direction changes and the angle of each of the one or more direction changes; and
providing a gesture event including the polygon and coordinates of the polygon to an application displayed relative to the polygon.

5. The method of claim 3, wherein the program removes data displayed within the polygon.

6. The method of claim 4, wherein the program removes data displayed within the polygon.

7. The method of claim 1 further comprising:
detecting that a speed of the touch gesture meets a predetermined value.

8. The method of claim 1, wherein the predetermined threshold angle is based on a zoom-level of the identified content on the touch screen.

9. A system, comprising: one or more computers and one or more storage devices storing instructions that are operable, when executed by the one or more computers, cause the one or more computers to perform operations comprising:
detecting a touch gesture on a touch screen;
detecting that a pressure of the touch gesture exceeds a predetermined threshold pressure value;
identifying one or more direction changes of the touch gesture;
determining that an angle of each of the one or more direction changes of the touch gesture exceeds a predetermined angle threshold value wherein the predetermined angle threshold value depends on the pressure of the touch gesture;
detecting that the touch gesture has terminated;
identifying content on the touch screen associated with the touch gesture in response to determining that the angle of each of the one or more direction changes meets the predetermined angle threshold value; and
removing the content associated with the touch gesture.

10. The system of claim 9, wherein the operations further comprise:
recording an initial location of the touch gesture;
determining that the touch gesture is moving on the touch screen; and
recording movement of the touch gesture.

11. The system of claim 9, wherein the operations further comprise:
generating a polygon based on one or more direction changes and the angle of each of the one or more direction changes; and
providing the polygon to a program currently displayed relative to the polygon.

12. The system of claim 9, wherein the operations further comprise:
generating a polygon based on one or more direction changes and the angle of each of the one or more direction changes; and
providing a gesture event including the polygon and coordinates of the polygon to an application displayed relative to the polygon.

13. The system of claim 11, wherein the program removes data displayed within the polygon.

14. The system of claim 12, wherein the program removes data displayed within the polygon.

15. The system of claim 9 wherein the operations further comprise:
detecting that a speed of the touch gesture meets a predetermined value.

16. The system of claim 9, wherein the predetermined threshold angle is based on a zoom-level of the identified content on the touch screen.

17. A non-transitory computer-readable medium storing software comprising instructions executable by one or more computers which, upon such execution, cause the one or more computers to perform operations comprising:
detecting a touch gesture on a touch screen;
detecting that a pressure of the touch gesture exceeds a predetermined threshold pressure value;
identifying one or more direction changes of the touch gesture;
determining that an angle of each of the one or more direction changes of the touch gesture exceeds a predetermined angle threshold value wherein the predetermined angle threshold value depends on the pressure of the touch gesture;
detecting that the touch gesture has terminated;
identifying content on the touch screen associated with the touch gesture in response to determining that the angle of each of the one or more direction changes exceeds the predetermined angle threshold value; and
removing the content associated with the touch gesture.

18. The non-transitory computer-readable storage medium of claim 17, wherein the instructions cause the one or more computers to further perform:
recording an initial location of the touch gesture;
determining that the touch gesture is moving on the touch screen; and
recording movement of the touch gesture.

19. The non-transitory computer-readable storage medium of claim 17, wherein the instructions cause the one or more computers to further perform:
generating a polygon based on one or more direction changes and the angle of each of the one or more direction changes; and
providing the polygon to a program currently displayed relative to the polygon.

20. The non-transitory computer-readable storage medium of claim 17, wherein the instructions cause the one or more computers to further perform:
generating a polygon based on the one or more direction changes and the angle of each of the one or more direction changes; and
providing a gesture event including the polygon and coordinates of the polygon to an application displayed relative to the polygon.

21. The non-transitory computer-readable storage medium of claim 19, wherein the program removes data displayed within the polygon.

22. The non-transitory computer-readable storage medium of claim 20, wherein the program removes data displayed within the polygon.

23. The non-transitory computer readable storage medium of claim 17, wherein the instructions cause the one or more computers to further perform:
detecting that a speed of the touch gesture meets a predetermined value.

24. The non-transitory computer readable storage medium of claim 17, wherein the predetermined threshold angle is based on a zoom-level of the identified content on the touch screen.

\* \* \* \* \*